CONSTANT FREQUENCY MODE    LINEAR FM MODE

United States Patent Office 3,512,108
Patented May 12, 1970

3,512,108
APPARATUS AND METHOD FOR THE PRECISE MEASUREMENT AND GENERATION OF PHASE MODULATED OR FREQUENCY MODULATED WAVEFORMS
Edsel A. Worrell, Baltimore, Md., assignor to Westinghouse Electric Corporation, East Pittsburgh, Pa., a corporation of Pennsylvania
Filed Jan. 13, 1965, Ser. No. 425,175
Int. Cl. H03b *3/10;* H03c *3/08;* H03k *1/16*
U.S. Cl. 332—19                    19 Claims

ABSTRACT OF THE DISCLOSURE

Circuitry for measuring or improving the quality of the output of a linear FM generator by selecting a base frequency and rate of change of frequency which results is repetitious periodic occurrences, such as zero crossings. Sets of zero crossings, which occur periodically in an intrinsic reference of the output waveform, are marked by a simple stable clock or oscillator. The position of a mark is compared with the position of a zero crossing in the waveform to be measured by sensing or integrating the portion of the linear FM waveform around a zero crossing over the duration of the sampling time. Appropriate feedback can improve the quality of the waveform output from the generator.

---

The present invention relates generally to frequency generator systems and more particularly relates to apparatus for measuring the deviation of frequency modulated or phase modulated waveforms of a generator system from a intrinsic reference and, when desired, correcting such deviation.

Phase modulation is the process which impresses a signal on a carrier by varying the phase of the carrier. Frequency modulation is a slight modification of phase modulation and is characterized as impressing a signal on a carrier by varying the rate of change of the phase of the carrier. In mathematical terms, the general expression for phase modulation is sin $[2\pi f_0 t + \theta(t)]$ where $f_0$ is the carrier frequency and $\theta(t)$ is the phase modulation. Likewise, the general expression for frequency modulation is sin $[2\pi f_0 t + 2\pi \int f(t) dt]$ where $f(t)$ is the frequency modulation term. The integral of the frequency modulation with respect to time is therefore the corresponding phase modulation in cycles.

Many applications require special frequency modulated or phase modulated waveforms. For example, some pulse compression and high resolution radars, as well as swept frequency measuring equipment, require the generation of an extremely accurate linear frequency modulated waveform (sometimes referred to as a frequency ramp). The frequency modulation is given by $f(t) = kt$ where $k$ is the rate of change of frequency and the expression for the waveform is sin $[2\pi f_0 t + \pi k t^2]$. The linear frequency modulation is said to deviate from linearity when $$\frac{d}{dt} f(t)$$

is not a constant. The linear frequency modulation is said to deviate from the correct slope when $$\frac{d}{dt} f(t)$$

is unequal to the desired rate of change of frequency $k$.

The allowable frequency deviations in the aforementioned applications are very small and cannot be maintained by frequency generators of the prior art. One such frequency generator uses a frequency discriminator to measure the output frequency of a variable frequency oscillator to control and correct the linearity of the modulation. Unfortunately, a sufficiently precise or linear frequency discriminator is presently beyond the state of the art. Another frequency generator of the prior art utilizes a digital computer to compute the positions of the zero crossings of the linear frequency modulated waveform from the formula $$t_n = \frac{1}{k}(-f_0 + \sqrt{f_0^2 + kn})$$

where $t_n$ is the time at the $n$th zero crossing of the waveform, or uses a digital memory to store precomputed positions. A square wave is created with these zero crossings by selecting appropriate delay lines to position the switching pulses and filtering the undesired frequencies from the square wave. The disadvantage of this technique, of course, is that digital computers or memories are complex and expensive and the switching pulses are poorly positioned because of inherent inaccuracies in the delay lines and the approximation inherent in positioning a pulse with a finite number of delay lines.

In a Pat. No. 3,144,623 entitled "Frequency Generator System" issued Aug. 11, 1964 to James W. Steiner there is illustrated in linear frequency modulated waveform generator wherein the number of zero values occurring in the output of a variable frequency oscillator is compared to the expected number of zero values in an intrinsic reference of the desired waveform. If the comparison shows the numbers to be unequal, a finite difference will result indicating the sweep frequency has varied from linearity. In order for such a finite difference to be sensed however the difference must be at least equal to one zero value. Hence, a phase deviation of at least one half cycle must occur before the error can be sensed or correction made.

An object of the present invention is to provide simple circuitry and method for measuring the quality of a frequency modulated waveform and having no theoretical limit to the size of phase error necessary for ascertaining such quality.

Another object of the present invention is to provide simple circuiry for correcting deviation of a frequency modulated or phase modulated waveform which has no theoretical limit to the size of the error necessary before a correction can be made.

Another object of the present invention is to provide simple circuitry to measure and correct, if desired, a deviation of a frequency modulated or phase modulated waveform from an intrinsic reference standard of the waveform with an implementation of better than $\frac{1}{72}$ of a cycle.

Another object of the present invention is to provide a simple circuit and method for measuring the quality of a frequency modulated or phase modulated waveform.

Another object of the present invention is to provide circuitry for generating a highly accurate linear frequency modulated waveform.

Another object of the present invention is to provide a simple reference system for checking the linearity of linear frequency modulated waveforms and which can be used in a closed loop control system for improving linearity.

Still another object of the present invention is to provide a linear frequency modulated waveform generator which can use a continuous wave crystal oscillator as a reference standard to precisely control linearity.

Briefly, the present invention accomplishes the above-cited objects by providing a stable reference oscillator or clock set to pulse at multiples of a common time unit during which an ideal intrinsic frequency modulated waveform or pulse modulated waveform has an integral set of zero crossings. For example, a linear frequency modulated waveform having a rate of change of frequency $k$ and selected to be of base frequency $$\sqrt{\frac{k}{2}}\,(m+1/2)$$

where $m$ is an arbitrary integer, will have a set of zero crossings that occur periodically at an interval of $$1/\sqrt{2k}$$

Consequently, a stable oscillator or clock is all that is required as the reference for measuring the output of a swept oscillator. The stable oscillator marks the intervals of time during which a fixed number of zero crossings should occur in an intrinsic reference of the waveform generator. At each mark, the position of an actual zero crossing of the linear frequency modulated waveform being generated is compared with the desired theoretical position. This can be readily done by measuring the symmetry of the generated waveform about a zero crossing during the time of a mark pulse.

More specifically, a phase detector gated by marks from the stable oscillator passes the portion of the generated waveform occurring during the gate signal through to an integrator which determines the deviation, if any, of the generated waveform from a perfectly positioned zero crossing. When desired, the error signal may be fed back to the waveform generator to control and correct the deviation of its output from the intrinsic reference standard.

Further objects and advantages of the present invention will be readily apparent from the following detailed description taken in conjunction with the drawings, in which.

Figure 1:
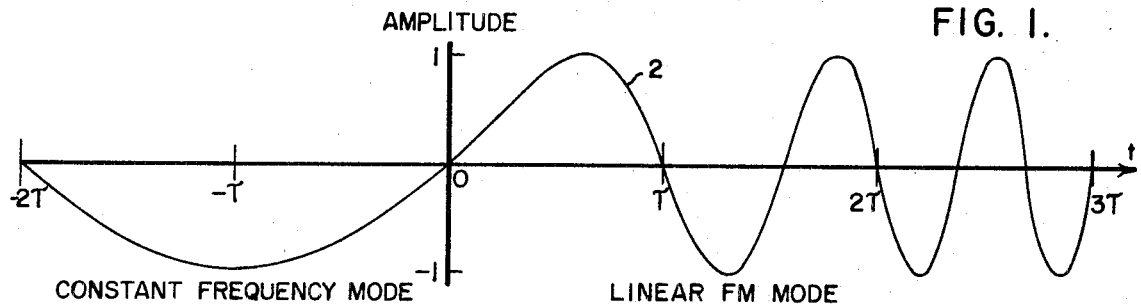
FIG. 1 is a graphical representation helpful in visualizing the present invention.

The general expression for a linear frequency modulated waveform can be readily shown to be sin $$[2\pi f_0 t + \pi k t^2]$$

where the frequency is $(f_0 + kt)$ and $k$ is the previously mentioned constant rate of change of frequency. Such a linear frequency modulated waveform 2 is illustrated in FIG. 1 for a base or carrier frequency $$f_0 = 1/2\sqrt{\frac{k}{2}}$$

i.e., the arbitrary integer $m$ is zero. For time less than zero, that is before the modulation has started, the waveform is constant frequency from the frequency generator so that the base frequency $f_0$ and phase will be correct to minimize transient deviations. FIG. 1 illustrates the fact that a set of zero crossings of the waveform occur periodically with the period, $\tau$. Other sets obviously do not fit into a periodic pattern.

The fact that a zero crossing occurs at the $n$th checking time, $$t_n = \frac{n}{\sqrt{2k}}$$

is easily verified by substituting in the general expression. Thus, $$\sin\,[2\pi f_0 t_n + \pi k t_n^2] =$$

$$\sin\left[2\pi\sqrt{\frac{k}{2}}\,(m+1/2)\frac{n}{\sqrt{2k}} + \pi k\left(\frac{n}{\sqrt{2k}}\right)^2\right]$$

$$= \sin\left[\pi n(m+1/2) + \pi\frac{n^2}{2}\right]$$

$$= \sin\left[\pi nm + \pi\frac{n(n+1)}{n}\right]$$

$$= 0$$

as the expression $$\frac{n(n+2)}{2}$$

is an integer for all integral numbers $n$, since either $n$ or $n+1$ is even and therefore divisible by 2. Accordingly, the sin function is zero when its argument is an integral multiple of $\pi$.

Figure 2:
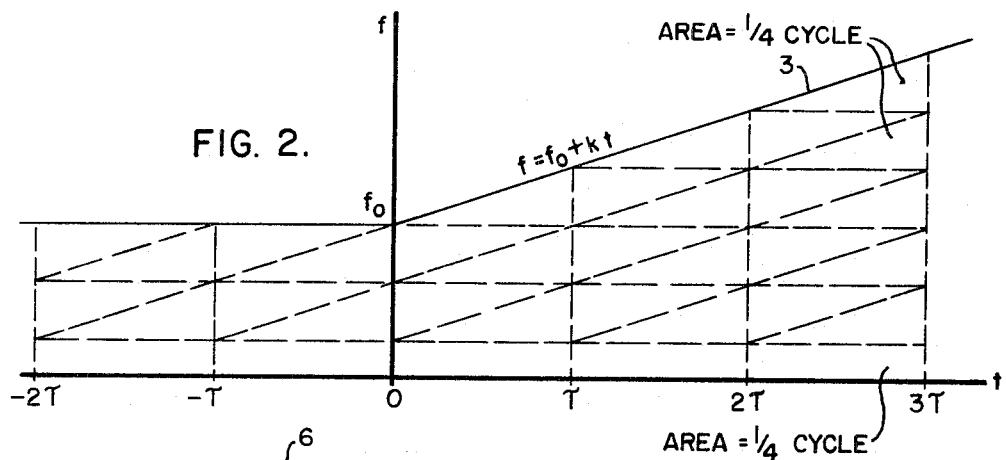
FIG. 2 is a graphical representation of a linear frequency modulated waveform useful in undrestanding operation of the present invention.

The occurence of the zero crossings at periodic intervals may be seen more readily by reference to the frequency versus time diagram in FIG. 2. The area under the curve 3 between $t=0$ and a given time is the accumulated phase in cycles. The subdivision of this area under the curve shows that each time interval of length $\tau$ contains an integral number $m$ of half cycles. This is more easily seen by observing that the first time interval after $t=0$ has an integral number of half cycles and that each succeeding interval contains one more half cycle. The area under the curve is divided into rectangular and triangular parts each representative of ¼ cycles. It is to be observed that each subsequent time interval $\tau$ is two triangles larger than the previous interval and thus ½ cycle larger.

Figure 3:
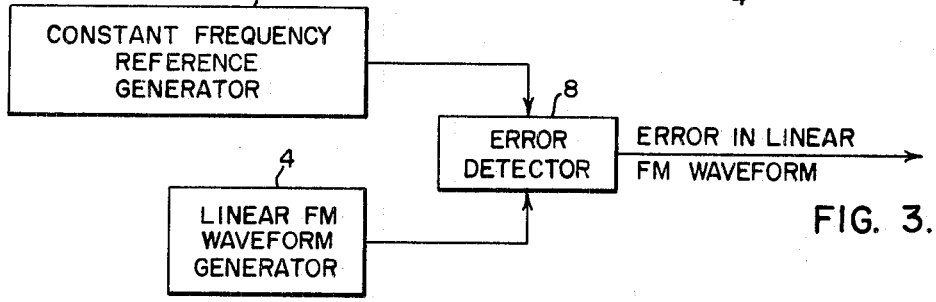
FIG. 3 is an electrical block diagram of an illustrative embodiment of the present invention.

A circuit for measuring the quality of a linear FM waveform is illustrated in FIG. 3. It is desired to check the linearity of the output of a linear FM generator 4. The measurement is accomplished in the error detector 8 by determining the error in position of each zero crossing as represented by the difference in position of the zero crossing and the corresponding time indication marked by a constant frequency reference generator 6. The reference generator 6 may be of any suitable design such as a crystal oscillator with a constant frequency output. The error detector 8 may be any of the numerous available devices for measuring the difference in time of the occurrence of two closely spaced events.

Figure 4:
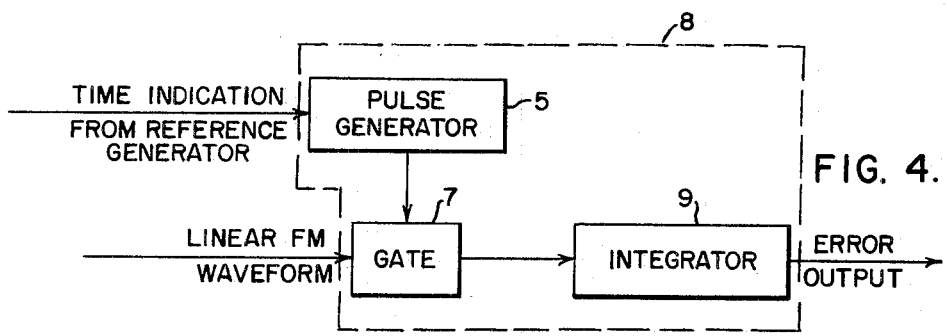
FIG. 4 is an electrical schematic block diagram showing in greater detail an element of the embodiment shown in FIG. 3.

One such error detector 8 is illustrated in FIG. 4 and more particularly referred to as a gated phase detector. Each time indication from the reference generator 6 initiates a pulse from a pulse generator 5 which actuates a gate 7. The gate 7 passes a segment of the linear frequency modulated waveform near a zero crossing from the generator 4 to an integrator 9.

Figure 5:
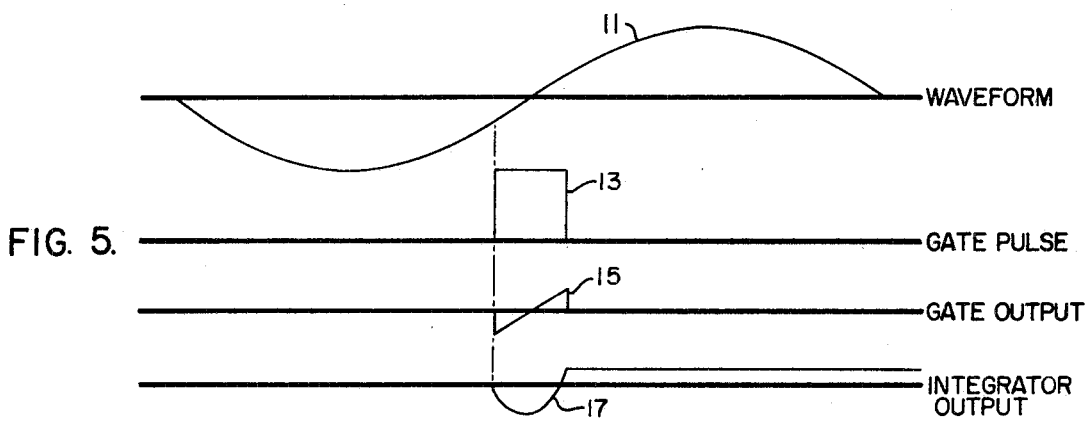
FIG. 5 is a waveform diagram useful in understanding the operation of the element detailed in FIG. 4.

The waveforms of interest are illustrated in FIG. 5. Assuming a linear FM waveform 11 from the generator 4, the gate pulse 13 enables passage of the portion 15 of the waveform about the zero crossing. When the linear FM waveform 11 has constant amplitude and the gate pulse 13 is shorter than ⅛ period of the highest frequency in the frequency ramp the integrator output 17 is nearly proportional to the phase error of the linear FM waveform compared to its intrinsic reference or ideal prototype.

If the integer, $m$, chosen to determine the carrier frequency is numerically even, some of the gated zero crossings will be positive going and others, negative going. The negative going zero crossings produce the wrong polarity for the error signal and those error signals must be reversed in polarity. This is easily accomplished by gating, when necessary, an inverter or amplifier having a gain of minus 1. Simple logic circuits can readily accomplish the gating since every other pair of error signals must be reversed. The problem of positive going and negative going zero crossings does not occur if the integer $m$ is chosen to be numerically odd.

It is to be understood that other circuits for comparing the position of a predetermined occurrence, such as the zero crossing discussed above, will be readily apparent to those skilled in the art. For example, trigger pulses generated at zero crossing can be compared in point of time or the waveform can be limited to sharpen the zero crossings.

Figure 6:
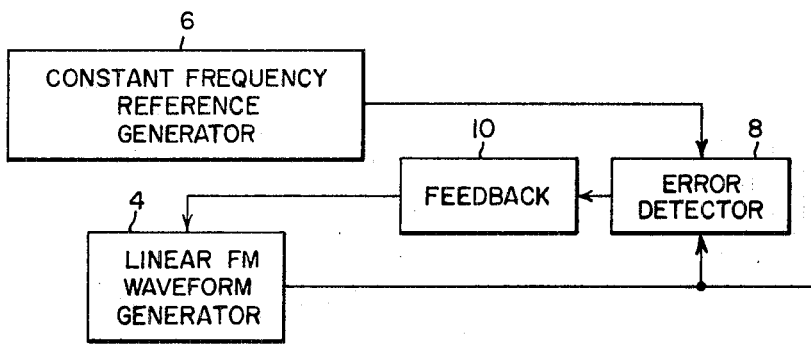
FIG. 6 is a simplified electrical block diagram of an alternate embodiment of the present invention.

A circuit for maintaining the linearity of a linear frequency modulated waveform generator is shown in FIG. 6. The circuit generates a linear FM waveform in the generator 4, which may be of any conventional type. The error in the linearity is measured by an error detector circuit 8 as shown in FIG. 4. The error signal is fed back by the circuit 10 to correct the phase and frequency of the output of the generator 4. Extreme accuracy is imparted to the output linear FM waveform of the system since it is effectively phase-locked to the precision constant frequency reference generator 6.

Figure 7:
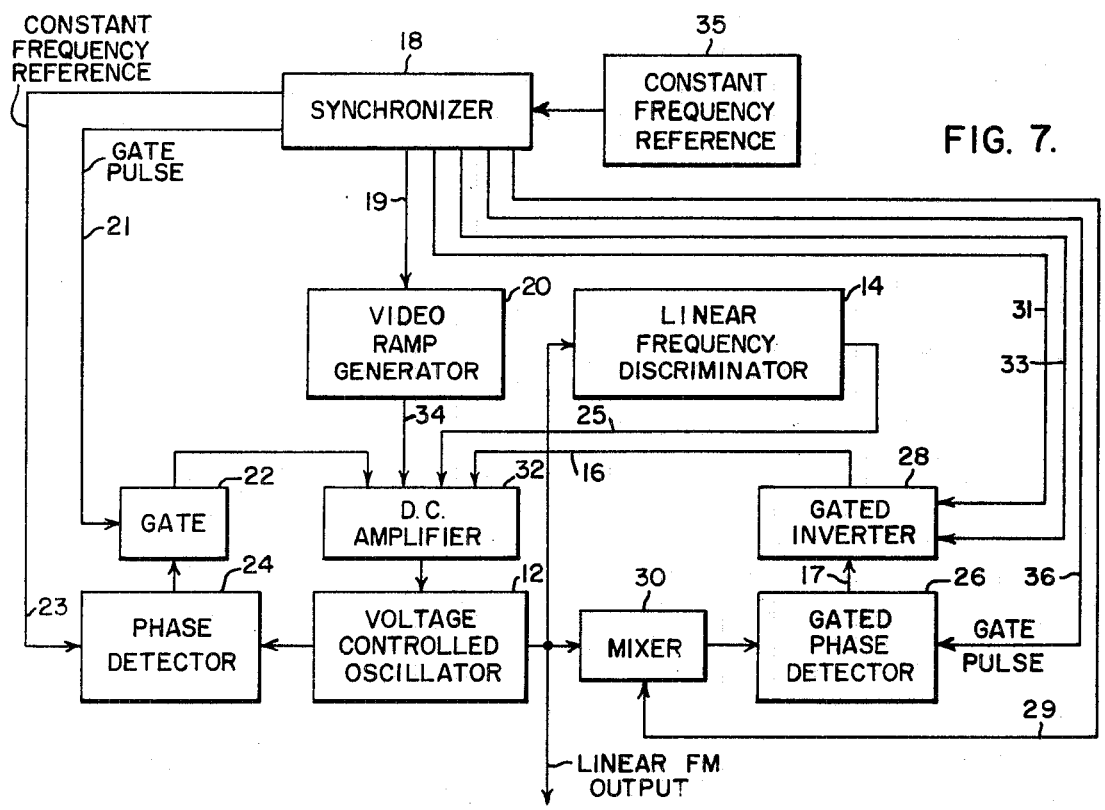
FIG. 7 is a more detailed block diagram of an illustrative embodiment shown in FIG. 6.

A more detailed examination of a circuit for improving the linearity of a linear FM waveform generator is shown in FIG. 7. The output of the generator has three modes. The first mode is a constant frequency output that is phase-locked to the reference; namely, the constant frequency mode of FIG. 1 prior to time $t=0$. The second mode is a linear frequency modulated waveform output. The third mode is the flyback to the constant frequency and reestablishment of the phase-locking to the reference generator. The initial linear waveform is created by driving a voltage controlled oscillator 12 through a DC amplifier 32 with a video sawtooth waveform from a video ramp generator 20. The video sawtooth waveform is nearly linear with a small non-linearity shaped to compensate as much as feasible for the non-linearity of the control characteristic of the voltage controlled oscillator 12. The output frequency of the voltage controlled oscillator is measured by a linear frequency discriminator 14. An error signal 25 is passed to the voltage controlled oscillator 12 through the DC amplifier 32 to decrease by feedback the frequency errors discovered by the linear frequency discriminator 14. This produces the best linear FM waveform available through use of the prior art.

A mixer 30 shifts the carrier frequency to a value convenient for precision measurement. A gated phase detector 26 measures the phase error of the linear FM waveform with respect to a gate pulse 36 produced by a synchronizer 18 and timed by the constant frequency reference 35. The phase error is then inverted to the correct polarity by a gated inverter 28 and blocked if necessary or fed back as a control signal 16 through the DC amplifier 32 to correct the frequency and phase of the output of the voltage controlled oscillator 12. Hence, the linear FM output is precisely phase-locked to the constant frequency reference 35 and cannot drift in frequency or phase during a long linear FM waveform. During the flyback mode, the frequency discriminator 14 forces the output of the voltage controlled oscillator 12 to return to the constant frequency carrier $f_0$ and a phase detector 24 provides the necessary initial coarse phase-locking due to the constant frequency reference 23 from the synchronizer 18. After coarse phase-locking is established a gate 22 removes the coarse phase error signal and the error signal 16 originating from the gated phase detector 26 produces the final precision phase-locking. The system is then in the constant frequency mode with the correct frequency and phase to produce another linear FM waveform when it is initiated.

The constant frequency reference 35 may be any type of precise clock such as a high quality crystal controlled oscillator. The synchronizer 18 counts and divides the output of the constant frequency reference 35 to provide the necessary control pulses, reference frequencies, and the precision gating pulses for the gated phase detector 26. The reference waveforms provided by the synchronizer 18 are a square wave switching voltage at 19 for starting and stopping a video ramp generator 20; a similar waveform 21 that enables the gate 22 to pass the output of the phase detector 24; a constant frequency reference 23 to the phase detector 24; a constant frequency signal 29 to the mixer 30; the precise gate pulses 36 to the gated phase detector 26; and rectangular voltage waveforms 31 and 33 to the gated inverter 28 to correct the output polarity of the gated phase detector 26.

Figure 8:
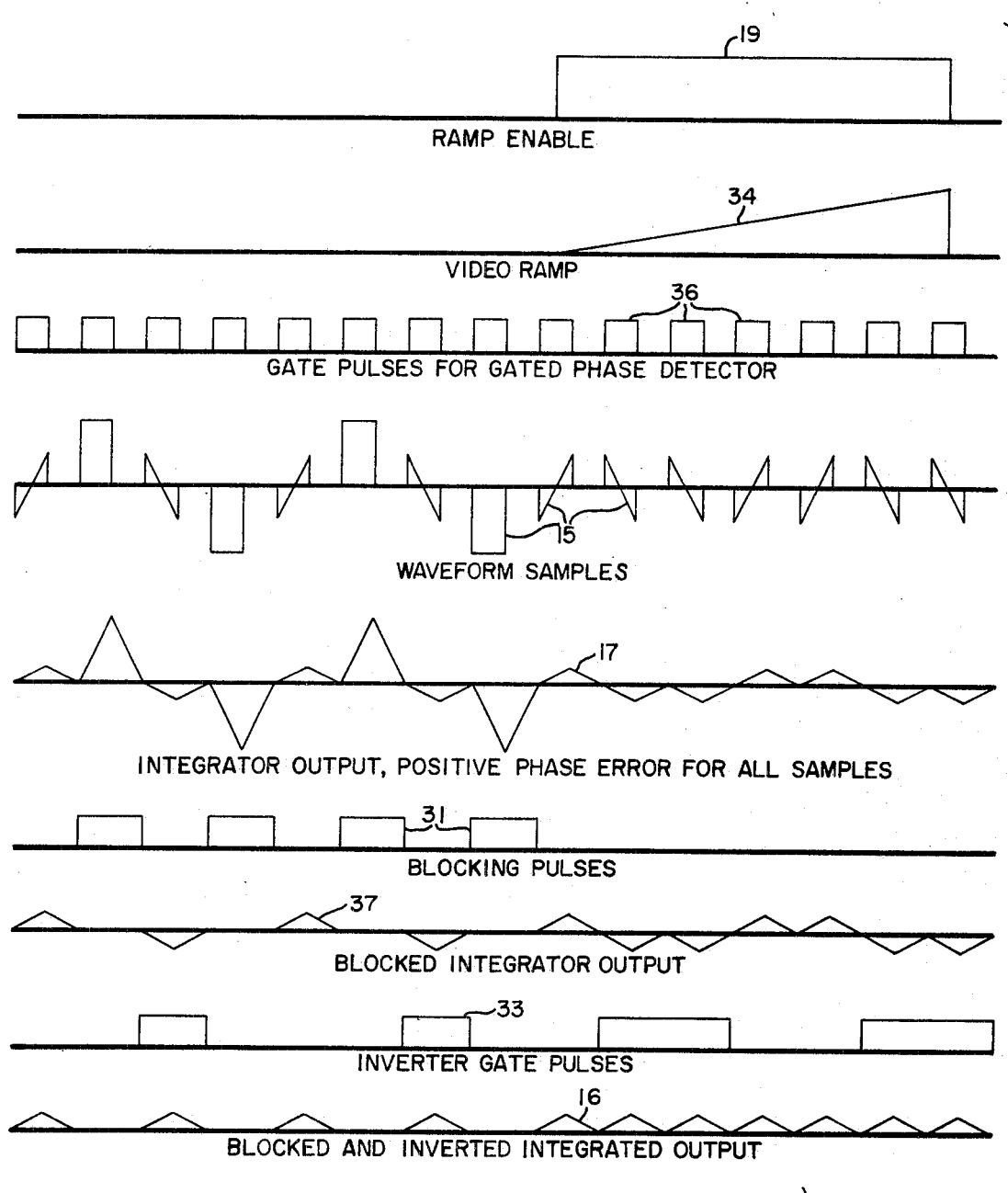
FIG. 8 is a waveform diagram useful in understanding the operation of the embodiment illustrated in FIG. 7.

Waveforms with respect to time are illustrated in FIG. 8. The constant frequency mode occurs when the ramp enable waveform 19 is zero and the linear FM mode occurs when the ramp enable waveform 19 is non-zero. The ramp enable waveform starts and stops the video ramp generator which produces the video ramp 34. The gated pulses 36 for the gated phase detector 26 cause the waveform to be sampled in the neighborhood of the zero crossings of the waveform to produce the waveform samples 15.

Every other sample during the constant frequency mode occurs at the peak of the waveform rather than at a zero crossing and must be rejected since it contains no error information. This can be seen in FIG. 1 where the waveform is $-1$ at the sample point $t=\tau$. A more precise illustration is given by FIG. 2 where it can be seen that during the constant frequency mode each interval contains an odd number of ¼ cycles. As a result, every other sample occurs at a peak or valley in the waveform and two intervals are necessary to reach a zero crossing. No significant performance loss is incurred however since it is easy to maintain a constant frequency and less error information is needed during the constant frequency mode. The integrator output 17 shown for illustrative purposes assumes that all phase errors are positive and thus makes evident the difference in error signal polarity due to sampling both positive and negative going zero crossings of the waveform. As mentioned previously a proper choice of carrier frequency $f_0$ will cause all the waveform samples during the linear FM mode to occur at positive zero crossings. In any case both polarities occur during the constant frequency mode and either inversion is necessary or only every fourth sample should be used. The waveforms 31 are blocking pulses for rejecting the samples that did not occur at the zero crossings. When desirable, the circuit performance can be improved by blocking the appropriate gate pulses 36 so the spurious samples would never be produced and would therefore not disturb the output of the integrator. The blocked integrator output would then be as illustrated at 37 and given the correct polarity in the gated inverter 28 when it is activated by the inverter gate pulses 33 and converted to the desired blocked and inverted integrator output 16. Conventional circuits (not shown), may be readily applied when desired to fill the gaps in the error waveform integrator output 16 during the constant frequency mode.

Figure 9:
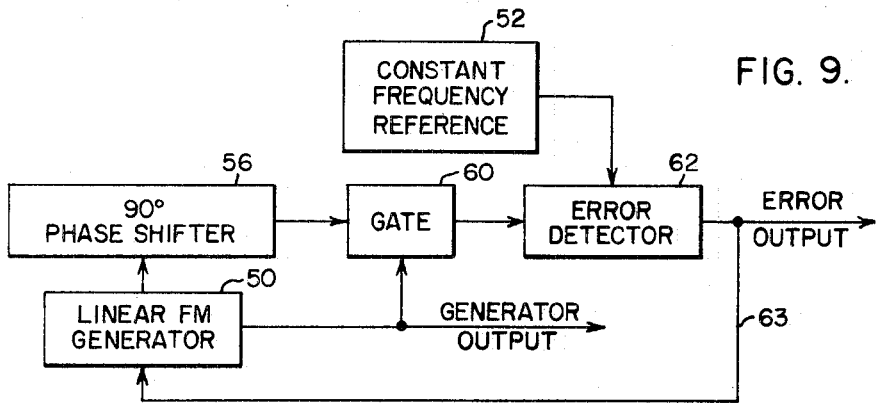
FIG. 9 is an electrical block diagram of yet another illustrative embodiment of the present invention.

FIG. 9 illustrates a multi-channel scheme to increase the number of checking points over those available in the circuits of the prior figures. The linear FM waveform, $\sin (2\pi f_0 + \pi k t^2)$ is phase shifted by 90° to produce the waveform $\cos (2\pi f_0 + \pi k t^2)$. Each waveform has a zero crossing where the other has a peak. As a result the phase need only be a multiple of ¼ cycle rather than ½ cycle to produce a time at which a zero crossing occurs in one of the waveforms. The checking interval is now $$\frac{1}{2\sqrt{k}}$$

which is a factor $$\frac{1}{\sqrt{2}}$$

shorter than the checking interval $\tau$ of the previous circuits. A constant frequency reference 52, a linear FM generator 50, and an error detector 62 perform as in the single channel scheme of FIG. 3. A 90° phase shifter 56 phase shifts the linear FM waveform to create the new zero crossings and the gate 60 selects the waveform which has a zero crossing at the appropriate checking time and passes it to the error detector 62. When the output of the generator 50 is to be controlled rather than only measured, the error output can be fed back at 63 to the generator to improve the quality of its output.

Figure 10:
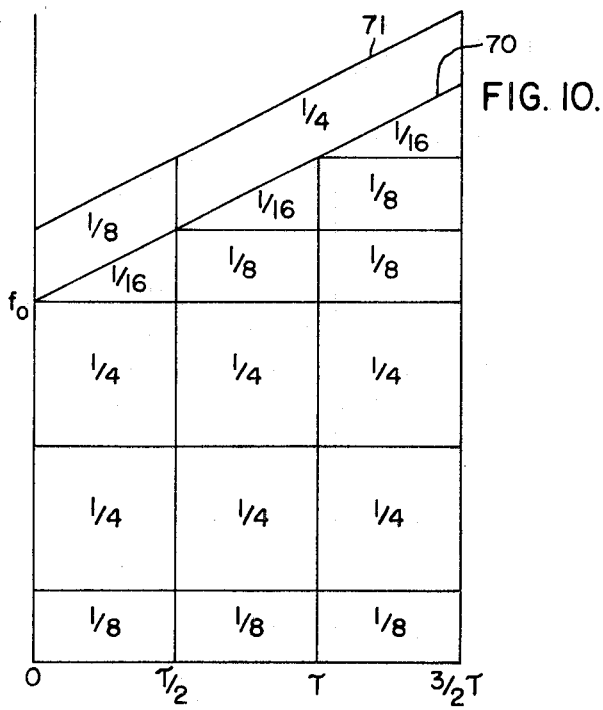
FIG. 10 is a graphical representation useful in understanding a further embodiment of the persent invention.

Another multiple channel scheme is based on the diagram shown in FIG. 10 wherein the areas under the waveform are identified as fractions of accumulated phase. The linear FM waveform 70 has zero crossings at the usual period $\tau$. The linear FM waveform when shifted in frequency by mixing with a carrier of appropriate frequency and phase produces a waveform represented at 71. The phase is selected to produce a zero crossing at time $\tau/2$. It is evident from the diagram that the interval $\tau/2$ to $3\tau/2$ contains an integral number of half cycles so that a zero crossing occurs at $3\tau/2$.

Figure 11:
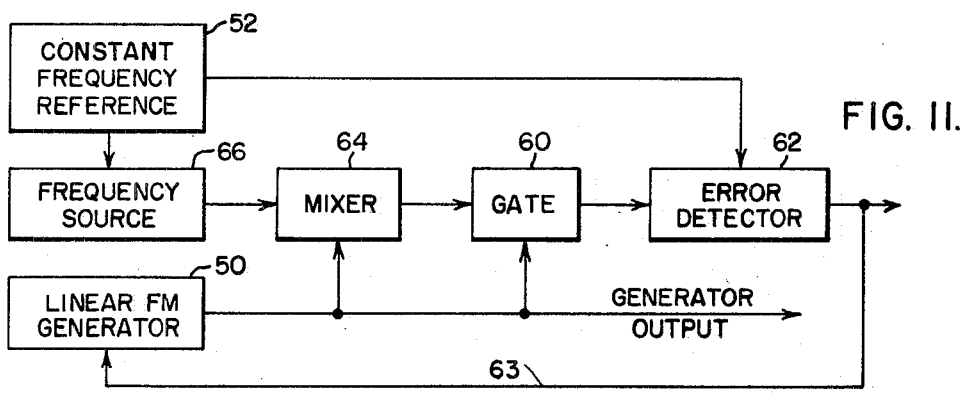
FIG. 11 is an electrical schematic diagram of the embodiment illustrated in FIG. 10.

Apparatus for the multiple channel scheme shown in FIG. 10 is illustrated in FIG. 11 where like items have been identified with the same reference characters used in the embodiment of FIG. 9. More particularly, the 90° phase shifter 56 is replaced by a mixer 64 and a frequency source 66 phase-locked to the constant frequency reference 52. The resultant output from the mixer 64 and the output from the generator 50 enter the gate 60. The gate 60 sends zero crossings to the error detector 62 as before. The checking interval is one half as long as that in the single channel circuit of FIG. 6. When desired the error signal can be fed back at 63 to improve its output.

The present invention is not limited to the precise measurement and generation of linear frequency modulated waveforms. Any application requiring special frequency modulation or phase modulation waveforms may be provided if the intervals of a set of zero crossings of the ideal prototype or intrinsic waveform are multiples of a common time unit. For example, a special waveform might have the interval pattern $\tau$, $2\tau$, $3\tau$, $2\tau$, $\tau$ etc.

Figure 12:
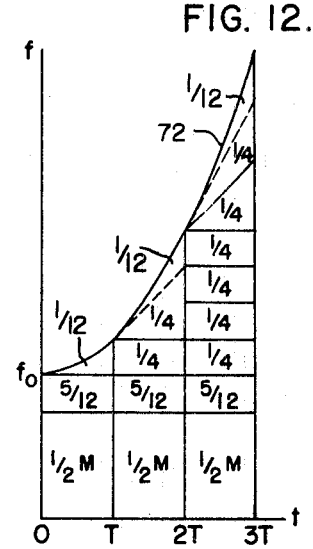
FIG. 12 is a graphical representation useful in understanding still another application of the present invention.

Consider the quadratic frequency modulated waveform, $$\sin\left(2\pi f_0 t + \frac{2}{3}\pi k t^3\right)$$

which can be considered to have cubic phase modulation, $$\phi(t) = \frac{2}{3}\pi k t^3$$

or quadratic frequency modulation $f(t) = kt^2$. From FIG. 12 it can be seen that zero crossings occur with the period, $$T = \sqrt[3]{\frac{1}{4k}}$$

The carrier frequency is selected so that $$f_0 = \sqrt[3]{4k}(1/2m + 5/12)$$

where $m$ is again an arbitrary integer that can be selected to give a convenient carrier frequency. The area for each time period T illustrated as adjacent the quadratic frequency curve 72 is equivalent to a ½ of a cycle or more generally $\frac{1}{3}kT^3$ cycles. The triangular areas and smaller rectangular areas are each identified as ¼ cycle or more generally $kT^3$ cycles. The remaining area under the quadratic curve 72 for each time interval T is illustrated equivalent to $(\frac{1}{2}m + \frac{5}{12})$ of a cycle. This remaining area is selected as convenient for a particular design and relates to selection of the carrier frequency $f_0$. Each area has been identified in the drawing.

The present invention recognizes and utilizes the repetition of a preselected occurrence namely zero crossings on the desired frequency modulated waveforms. Enabling pulses to the gated phase detector are keyed to the predetermined occurrence of preselected units of phase. The sampling time interval determined by the duration of each enabling pulse and the number of samples obtained during a repetitious output, such as a ramp function, has material bearing on the quality of performance of the circuit. The sampling time must be considerably less than ½ cycle of the highest frequency of the ramp. This is a simple problem in the present invention since a sampling time of even $\frac{1}{12}$ of a cycle will provide ample opportunity to integrate that portion of the waveform around a selected zero crossing. However, when desirable, a more reasonable sampling time may be obtained by mixing the ramp down to a lower frequency as previously described. The number of samples to be taken over a particular function or ramp should advantageously be as large as possible so that the correction loop will derive a maximum useful error signal.

It is to be noted that any oscillator or clock with a frequency such that the time interval corresponding to a whole number of half cycles or preselected numbers of other portions of cycles can be used to provide the reference points with its zero crossings. The attainable precision is only limited by the stability of the clock or oscillator which will be used as a reference standard.

While the present invention has been described with a degree of particularity for the purposes of illustration, it is to be understood that all alterations, modifications, and substitutions within the spirit and scope of the present invention are herein meant to be included. For example, while zero crossings have been utilized for purposes of illustration, it is to be understood that any repetitious predetermined occurrence in an intrinsic reference of the waveform to be measured or controlled may be used.

I claim as my invention:

1. A circuit for measuring the quality of an FM waveform which changes polarity at a predetermined rate, comprising in combination; constant frequency reference means for marking a plurality of sampling times each of fixed duration and each separated by a fixed time interval during which an integral number of polarity changes occur in an intrinsic reference of said waveform, the number of polarity changes varying at a predetermined rate from interval to interval; and error detector means for comparing the symmetry of the FM waveform about a polarity change during said sampling time.

2. A circuit for measuring the quality of a linear FM waveform comprising, in combination; pulse generator means for providing a plurality of enabling pulses, each of fixed time duration equal to the time necessary for sensing a polarity change of the waveform when at its highest frequency, each enabling pulse separated by a time of fixed duration during which an integral number of polarity changes would occur in an intrinsic waveform, the number of polarity changes varying at a predetermined rate between enabling pulses; gating means responsive to an enabling pulse for passing the FM waveform; and means for comparing the symmetry of the FM waveform gated by said gating means as its polarity changes whereby a first signal indicates the polarity change is early and a second signal indicates the polarity change is late within the time duration of the enabling pulse when compared to the time when a perfectly located polarity change should occur.

3. A circuit for measuring the quality of a linear FM waveform comprising, in combination; gating means responsive to an enabling pulse for passing a portion of said waveform for the duration of said enabling pulse; means for clocking a plurality of enabling pulses each of fixed time duration equal to the time necessary to sample a zero crossing of the waveform at the highest frequency of said waveform and each separated by a fixed time interval during which an integral number of zero crossings occur in an intrinsic value of said waveform; and error detector means for comparing the symmetry of the FM waveform about a zero crossing passing through said gating means to provide an output signal indicative of the time during said enabling pulse that the FM waveform crosses zero.

4. A circuit for measuring the quality of a frequency modulated or phase modulated waveform against an intrinsic reference standard of said waveform wherein the intervals of a set of zero crossings are multiples of a common time unit, comprising, in combination; means for providing an enabling pulse at chosen multiples of said common time unit, each enabling pulse being of sufficient duration to sense the slope of the waveform to be measured; gating means responsive to said enabling pulses for passing said waveform; and means for comparing the slope of the portion of said waveform so passed with the occurrence in time of the enabling pulse.

5. A circuit for measuring a linear frequency modulated waveform comprising, in combination; a linear frequency modulated generator having an output of carrier frequency $$\sqrt{\frac{k}{2}}(+1/2)$$

where $m$ is an arbitrary integer and $k$ is the desired rate of change of frequency; constant frequency reference means for providing enabling pulses at intervals of time $$\frac{1}{\sqrt{2k}}$$

where $k$ is the aforementioned rate; error detector means responsive to said enabling pulse for sensing any deviation in position of the generator waveform output from interval to interval.

6. Circuitry for generating an improved linear frequency modulated waveform in accordance with claim 5 including feedback means responsive to any said deviation for controlling the output from said generator.

7. A circuit for mesuring a linear frequency modulated waveform comprising, in combination; a linear frequency modulated generator having an output of carrier frequency $$\sqrt{\frac{k}{2}}(m+1/2)$$

where $m$ is an arbitrary integer and $k$ is the desired rate of change of frequency; means for providing enabling pulses at intervals of time $$2\frac{1}{\sqrt{k}}$$

where $k$ is the aforementioned rate; means for shifting a sample of the output from said linear frequency modulated generator by 90°; means responsive to said enabling pulses for sensing any deviation in position of the generator waveform output and the shifted generator waveform from interval to interval.

8. Circuitry for generating an improved linear frequency modulated wave form in accordance with claim 7 including feedback means responsive to any said deviation for controlling the output from said generator.

9. In a circuit for measuring the linearity of the output of a linear FM waveform generator, the combination comprising; means for providing a train of pulses, the time interval between pulses being constant and selected to allow the phase of an intrinsic linear FM waveform to vary at the rate of an integral number of one-half cycles per time interval; and error detecting means for comparing the coincidence of a pulse with a zero crossing of said output to provide an error signal indicative of the position of said zero crossing during a pulse, the magnitude of said error signal being indicative of the extent of error between said output and the intrinsic waveform.

10. The circuitry of claim 9 including means responsive to said error signal for correcting the phase of the generator output.

11. In a method of improving the linearity of the FM waveform output from a frequency ramp generator, the steps comprising; sampling the phase of the FM waveform during a constant sampling time which is substantially small in comparison to a half cycle of the highest instantaneous ramp frequency; periodically sampling the phase of the FM waveform at a frequency equal to the square root of twice the slope of the desired frequency ramp; and adjusting the ramp slope of said generator so that an integral number of additional units of phase will occur during each period.

12. A circuit for improving the linearity of the output of a linear FM waveform ramp generator comprising, in combination; a variable frequency oscillator; control means operatively connected to said oscillator for providing a first approximation to the desired ramp; gating means responsive to an enabling signal to allow passage of the generator output waveform; clocking means for providing enabling pulses of substantially short duration in comparison to one-half cycle of the highest desired frequency output from said generator; means for spacing said enabling pulses at regular time intervals during which the accumulated phase of a theoretically perfect linear frequency modulated waveform would be an integral number of the units of phase; means for measuring the slope of the waveform gated by said gating means; and a feedback loop responsive to the instantaneous slope of the waveform gated by said gating means to correct the slope of the first approximation to the ramp output from the generator to achieve phase locked accuracy of the instantaneous frequency.

13. The apparatus of claim 12 including means for mixing a sample of the output of said oscillator with another frequency signal to reduce the sample to said gating means to a lower frequency.

14. The apparatus of claim 13 including means in said feedback loop for changing the polarity of the error correction signal from the gated phase detector whenever the slope of the sampled portion of the FM waveform is of a predetermined arithmetic sense.

15. In a linear frequency modulated waveform generator circuit the combination comprising; means for sampling the phase of the frequency modulated waveform; means for enabling said sampling means at regular intervals, the interval being of fixed time duration wherein an integral number of zero crossings will occur in an intrinsic linear frequency modulated waveform reference; the time that said sampling means is enabled being chosen to be substantially less than one-half the period of the highest frequency of the sampled linear FM waveform; and means responsive to the slope of said waveform sampled as the waveform changes polarity for feeding back an error signal to said generator to improve the linearity of its output.

16. Circuitry for measuring the quality of the output of a swept frequency generator comprising, in combination; a source of stable frequency signal; means for selecting a set of zero crossings in the waveform of the stable frequency signal; and means for comparing the position of each zero crossing of the waveform of said set with the corresponding zero crossing in the waveform of the output of the swept frequency generator to determine the extent of deviation in position of a zero crossing in the output of the swept frequency generator to a related zero crossing in the waveform of said stable frequency signal source.

17. The circuitry of claim 16 wherein the swept frequency is linear.

18. Circuitry for controlling the quality of the output of a swept frequency generator comprising, in combination; a source of stable frequency signal; means for selecting a set of zero crossings in the waveform of the stable frequency signal and for comparing the position of each zero crossing of the waveform of said set with the corresponding zero crossing in the waveform of the output of the swept frequency generator to determine the extent of deviation in position of a zero crossing in the output of the swept frequency generator to a related zero crossing in the waveform of said stable frequency signal source; and feedback means responsive to the extent of said deviation for correcting the output of the swept frequency generator.

19. Circuitry for measuring the quality of a frequency modulated or phase modulated waveform comprising, in combination; a generator of the modulated waveform; a constant frequency reference source; a second frequency source having an output phase locked to said constant frequency reference source; and means for mixing the direct output signal from the generator to be measured with the output of said second frequency source for providing zero crossings at predetermined time intervals other than the time intervals at which crossings occur in the direct output from said generator; means for providing enabling pulses at said time intervals; gating means responsive to said enabling pulses for selectively passing the mixed output and direct output only during an enabling pulse; and means for sensing the occurrence of a zero crossing of the mixed output and direct output with respect to the timing of the enabling pulse.

References Cited

UNITED STATES PATENTS

| | | | |
|---|---|---|---|
| 2,705,284 | 3/1955 | Hershberger | 332—19 X |
| 2,732,496 | 1/1956 | Slonczewski | 324—79 X |
| 2,878,448 | 1/1959 | Maxey | 328—134 X |
| 3,030,582 | 4/1962 | Holcomb et al. | 332—19 X |
| 3,068,407 | 12/1962 | Altman | 324—79 X |
| 3,144,623 | 8/1964 | Steiner | 332—19 X |
| 3,308,387 | 3/1967 | Hackett | 328—134 X |

ALFRED L. BRODY, Primary Examiner

U.S. Cl. X.R.

324—79; 328—134, 63; 329—50, 136; 331—23